United States Patent [19]

Arrendiell et al.

[11] Patent Number: 4,712,927
[45] Date of Patent: Dec. 15, 1987

[54] NESTED PLASTIC EXTENSION SLIDE

[76] Inventors: Robert Arrendiell; Gwendolyn E. Ellis, both of 280 Sugarberry Cir., Houston, Tex. 77024

[21] Appl. No.: 26,150

[22] Filed: Mar. 16, 1987

[51] Int. Cl.⁴ .............................................. F16C 29/02
[52] U.S. Cl. ......................................... 384/23; 384/49
[58] Field of Search ................... 384/23, 42, 49, 20, 384/21, 22; 312/350, 343, 348

[56] References Cited

U.S. PATENT DOCUMENTS

| | | |
|---|---|---|
| 2,692,170 | 10/1954 | Penkala . |
| 3,160,448 | 12/1964 | Abernathy et al. ................... 384/23 |
| 3,321,253 | 5/1967 | Everburg ............................. 384/23 |
| 3,353,874 | 11/1967 | Del Vecchio et al. . |
| 3,371,968 | 3/1968 | Loake . |
| 3,751,125 | 8/1973 | Hudson . |
| 3,927,918 | 12/1975 | Dobbratz . |
| 3,929,386 | 12/1975 | Read ................................. 384/23 |
| 4,018,488 | 4/1977 | Manson . |
| 4,114,945 | 9/1978 | Lutz ................................. 384/42 |
| 4,469,384 | 9/1984 | Fler et al. . |
| 4,537,450 | 8/1985 | Baxter . |

*Primary Examiner*—Lenard A. Footland
*Attorney, Agent, or Firm*—Vaden, Eickenroht, Thompson & Boulware

[57] ABSTRACT

A nested plastic slide is disclosed having three pieces that fit together with very little spacing between parts. The vertical dimension of all parts is greater than the horizontal dimension. The part most subject to damage is the inner piece, which is removable and thereby replaceable by the removal of a single peg. Except for a few individual ball bearings included in approriate recesses, no metal parts are required.

11 Claims, 7 Drawing Figures

NESTED PLASTIC EXTENSION SLIDE

BACKGROUND OF THE INVENTION

1. Field of the Invention

This invention pertains to an apparatus for mounting a drawer into a cabinet or similar apparatus and more particularly to a slide mounting.

2. Description of the Prior Art

A drawer can be mounted into the opening of an accommodating cabinet or desk by simply being built to size and slipped into the opening. Indeed, inexpensive furniture and cabinet construction provide such a fitting together of parts. However, a drawer mounted in such a way often sticks, turns slightly sideways when pulled out or pushed in and therefore binds, does not fit flush when shut and pushes inwardly of the front of the cabinet or other apparatus, embarrassingly falls to the floor when inadvertently pulled too far open, and even when it does not pull out, tilts downwardly forward in an awkward fashion.

Therefore, it has long been recognized that it was desirable to provide a mounting that would overcome the above listed shortcomings. First, cooperating runners were mounted inside the wall of the apparatus and the side of the drawer to stabilize the movement of the drawer. However, such runners did not allow the drawer to be pulled as far forward as desired. Moreover, the early runners did not enhance the sliding of the drawer except by the reduced surface of the runners compared with the entire drawer bottom resting on a mating bottom support of the cabinet or other apparatus.

Finally, slide mountings were introduced that included ball bearings and that included multiple nested pieces so as to permit the supported drawer to be pulled all of the way forward from its accommodating opening while remaining supported or held in position to be returned. Such supports have universally been comprised of metallic pieces, which are stronger and less fragile than wooden runners. It is apparent that metallic runners are acceptable in many, if not most applications because of their strength. They do need lubrication, however, and they are expensive to fabricate compared with plastic. Plastic, on the otherhand, although self lubricating, has not been felt to be strong enough for most applications.

One patent, namely U.S. Pat. No. 3,927,918, Dobbratz, issued Dec. 23, 1975, is known that includes internal plastic blocks encased by metal parts, which plastic blocks encased by metal parts, which plastic blocks provide self-lubrication to the slide. However, the blocks themselves are surrounded by weight bearing metal. It has been discovered, however, that with applicants' design, hereafter described, it is possible to provide a virtually all plastic extension slide for mounting drawers and the like without incorporating metal support. In fact, the design includes three nested parts to permit full extension of the drawer, all without metal support pieces being included.

Therefore, it is a feature of the present invention to provide an improved three-part nested plastic slide that is sufficiently strong so as to support a drawer even when it is fully extended from its accommodating opening.

It is another feature of the present invention to provide an improved three-part nested plastic slide that can be disassembled and assembled for installation and replacement-of-parts purposes without special tools.

SUMMARY OF THE INVENTION

A three-part plastic extension slide is provided that is made up of hard plastic parts, each part having a rectangular cross-section. The weight of the drawer is supported or primarily carried by parts that are aligned so that their vertical dimensions are greater than their horizontal dimensions. The outer and center or intermediate pieces each are generally "C" shaped and carry the respective loads on a generally vertically thick portion or branch at the end of their respective arms. Ball bearings are accommodated without traces at the location of greatest load bearing, but in the broadest aspect, the self-lubrication qualities of the plastic is relied upon. The nesting also provides for a compact cross-section without appreciable gaps anywhere between the nested parts. Finally, the removal of a single peg will result in a sufficient disassembly of the parts that replacement of defective parts is readily accomplishable without special tools.

BRIEF DESCRIPTION OF THE DRAWINGS

So that the manner in which the above-recited features, advantages and objects of the invention, as well as others which will become apparent, are attained and can be understood in detail, more particular description of the invention briefly summarized above may be had by reference to the embodiment thereof which is illustrated in the appended drawings, which drawings form a part of this specification. It is to be noted, however, that the appended drawings illustrate only a preferred embodiment of the invention and are therefore not to be considered limiting of its scope, as the invention may admit to other equally effective embodiments.

IN THE DRAWINGS

Figure 1:
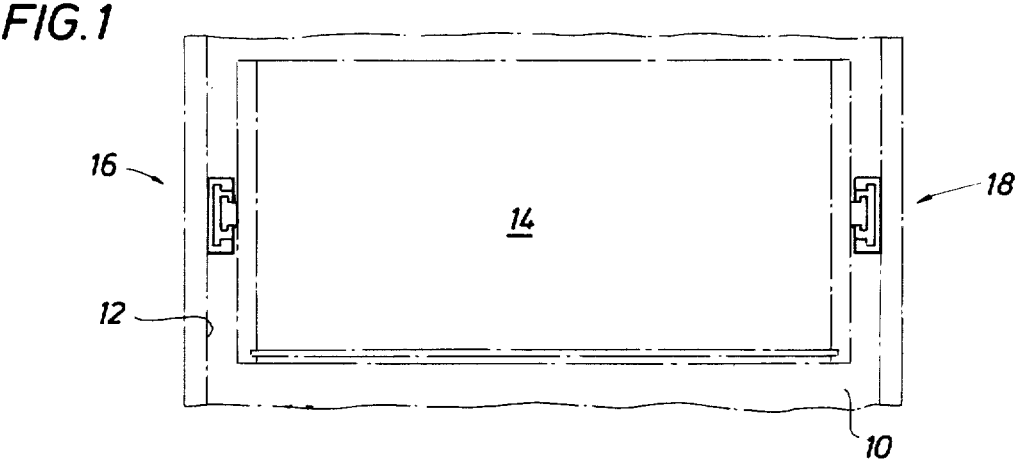

FIG. 1 is a front view of a drawer mounted in an accommodating opening of a cabinet or other apparatus utilizing two extension slides in accordance with a preferred embodiment of the invention.

Figure 2:
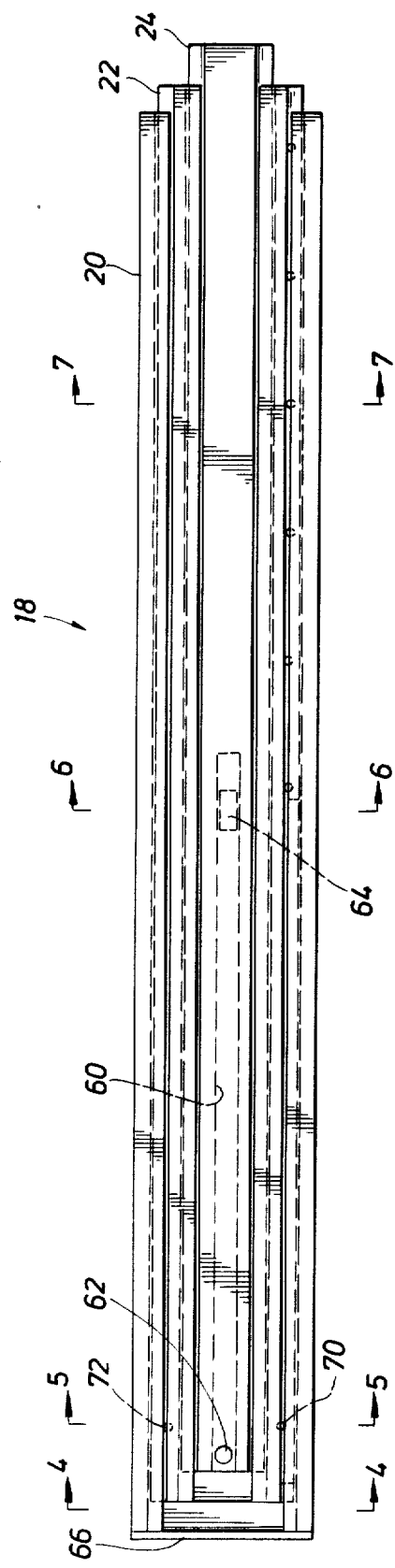

FIG. 2 is a plan view of a preferred embodiment of the invention with the extension slide almost fully collapsed or nested.

Figure 3:
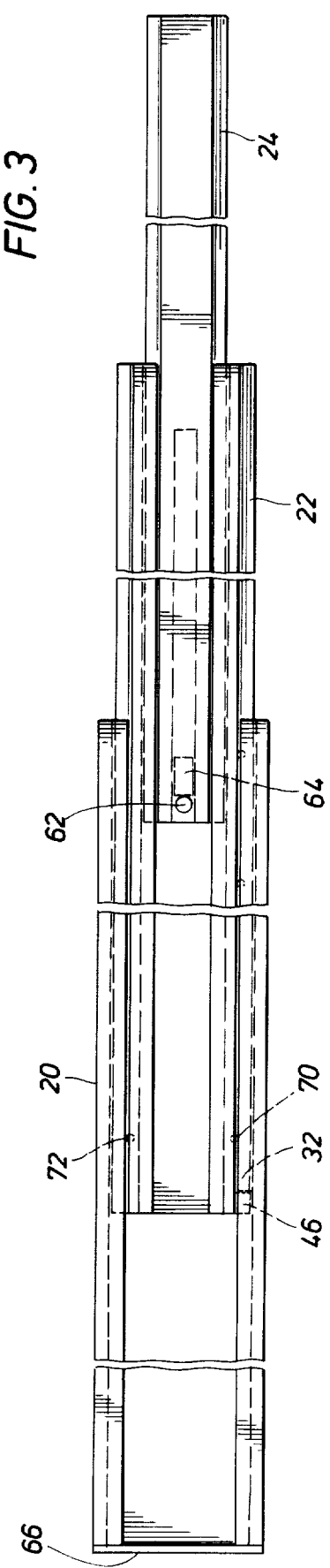

FIG. 3 is a plan view of the embodiment shown in FIG. 2 with the extension slide almost fully extended.

Figure 4:
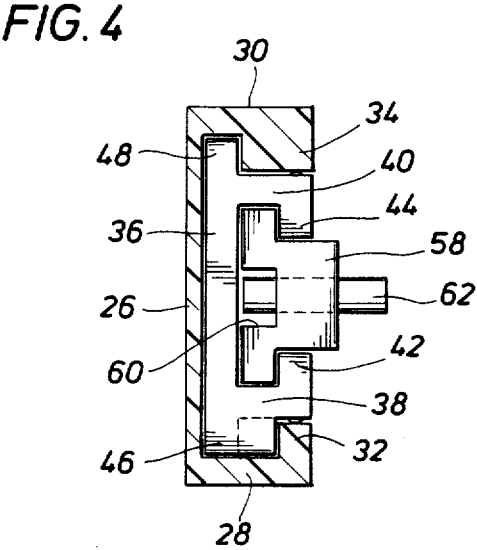

FIG. 4 is a vertical cross-section of the view taken at line 4—4 shown in FIG. 2.

Figure 5:
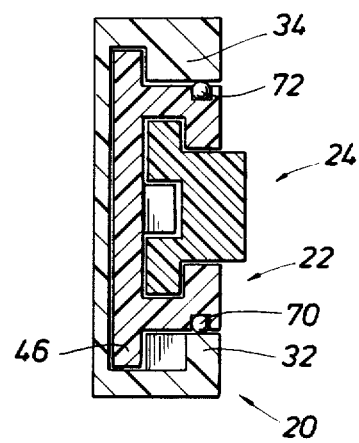

FIG. 5 is a vertical cross-section of the view taken at line 5—5 shown in FIG. 2.

Figure 6:
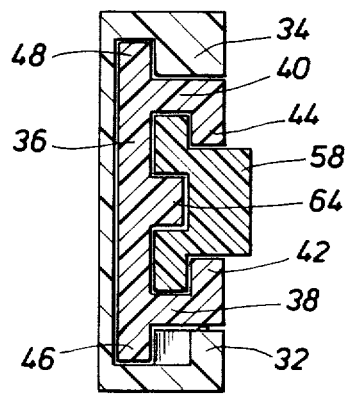

FIG. 6 is a vertical cross-section of the view taken at line 6—6 shown in FIG. 2.

Figure 7:
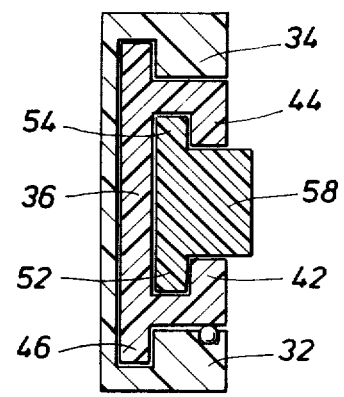

FIG. 7 is a vertical cross-section of the view taken at line 7—7 shown in FIG. 2.

DESCRIPTION OF THE PREFERRED EMBODIMENT

"Drawer" as used herein refers not only to a drawer in a conventional sense suitable for holding items within the confines of a front, back and two side walls, but pertains to shelves, turntables and other apparatus that pull in and out of a cabinet or similar apparatus in a fashion similar to a conventional drawer.

A drawer is referred to sometimes herein as being mounted in a suitable apparatus. Such apparatus includes file cabinets and other cabinets, desks, tables and other furniture, and built-ins, such as consoles, utility shelving and the like.

Now referring to the drawings and first to FIG. 1, apparatus 10 including an opening 12 for accommodating therein a drawer 14 that is mounted therein using two nested plastic extension slides 16 and 18 in accordance with the present invention. Slide 16 is used on the left side of the drawer as it is faced in FIG. 1 and slide 18 is used on the right side. As is described more fully below, an inner piece of the slide is affixed, such as by suitable screw holes and screws, to the outer left side wall of the drawer.

The outer piece of the slide is mounted in similar fashion to the adjacent inside wall of the apparatus opening.

Slide 18 is substantially a mirror image of slide 16 and is similarly mounted between the outer right side wall of drawer 14 and the adjacent inside wall of the opening of the apparatus accommodating the drawer.

Although screw installation is usually convenient, the slides can be mounted using rivets, glue or other means, if desired.

Now referring to FIGS. 2 and 3, a nested slide 18 is shown in plan view in accordance with the present invention. Slide 18 generally comprises an outer piece 20, a center or intermediate piece 22 and an inner piece 24. The center piece 22 nests within outer piece 20 and inner piece 24 nests within center or intermediate piece 22.

FIGS. 4, 5, 6 and 7 illustrate cross-sectional views taken at the respective section lines indicated in FIG. 2. From these cross-sectional views it will be seen that outer piece 20 is generally "C" shaped having a vertical base 26, a lower arm 28 and an upper arm 30. Lower arm 28 terminates with an upturned lower portion or branch 32 and upper arm 30 terminates in a downturned upper branch 34. As can be readily seen in FIGS. 4 through 7, downturned upper branch 34 is of uniform dimension at each of the cross-sectional positions. However, the upturned lower branch 32 is not. Just to the right of section line 6—6 in FIG. 2, upturned lower branch 32 doubles in thickness as shown by the thickness of branch 32 in FIG. 7 compared with the dimension of branch 32 in the other three cross-sectional views.

Center piece or intermediate piece 22 is generally "C" shaped in vertical cross-section facing in the same direction as outer piece 20 just described. Center piece 22 includes a vertical base 36, a lower arm 38 and an upper arm 40. Lower arm terminates at its outer end in upturned lower branch 42 and upper arm 40 terminates at its outer end in downturned upper branch 44. Base 36 extends downward from arm 38 to include lower flange 46 and extends upwardly to include upper flange 48. These flanges are located respectively between vertical base 26 of outer piece 20 and lower branch 32 and upper branch 34 respectively on arms 28 and 30 of outer piece 20. It may be seen that there is very little space between the parts as illustrated in the cross-sectional views. However, it should be noted that the thickness of flange 46 is double the thickness at the rear end of center piece 22 than it is elsewhere, as shown in FIGS. 5, 6 and 7. Hence, the double dimension of lower flange 46 provides a longitudinal stop when it encounters the double thickness of upturned lower branch 32, as shown in FIG. 3.

Inner piece 24 fits snuggly within the confines of center piece 22 by including in its base 50 a lower flange 52 and an upper flange 54 that are respectively located between base 36 and upturned lower branch 42 and downturned upper branch 44 of center piece 22. Middle portion 58 extends to the right through the opening provided by branches 42 and 44 to allow inner piece 24 to be connected to the drawer, as previously described. It will be seen particularly in FIG. 7 that the three pieces 20, 22 and 24 nest in such a manner that all the parts have very little spacing between their respective component portions.

A slot 60 is provided in middle portion 58 starting at a point from about its mid position and extending to the left as shown in FIGS. 2 and 3. This slot is closed off by peg 62 which is accommodated by a tightly fitting hole in middle portion 58 at its rear end, that is the left end as shown in FIG. 2. A projection 64 is included in base 36 of center piece 22 that is only slightly smaller than the vertical dimension of slot 60, as shown in FIGS. 2, 3 and 6. Hence, as inner piece 24 is extended to the right as shown in FIG. 3, slot 60 provides for its ready movement until it encounters peg 62 which provides the limit position or outer extension position for piece 24.

A rear plate 66 located across the end of outer piece 20 on the lefthand side thereof in FIGS. 2 and 3 provides the absolute limit stop for nesting pieces 20, 22 and 24 together in the closed position.

As may be seen in FIGS. 2 and 3 a plurality of steel balls 68 are included in the top edge of upturned lower branch 32 in that portion where branch 32 has a double thickness dimension. Accommodating recesses in the top edge of branch 32 are provided for these balls 68. It may be seen that as center piece 22 is moved forward the weight of the piece carried by branch 22 is also applied to these balls, which act as ball bearings in reducing the sliding friction between pieces 20 and 22. Therefore, although the plastic parts are self lubricating to some extent the balls provide an additional friction-reducing means to provide ease of sliding, particularly under a load condition.

It may be seen that two additional balls 70 and 72 are located at the rear of intermediate piece 22, ball 70 being located at the lower position and ball 72 being located at the upper position near its rear end, actually along section line 5—5 as shown in FIG. 2. These balls are in respective recesses located on the underneath side of branch 42 and on the upper top side of branch 44. Hence, as the slide is moved forward, ball 70 provides further friction lubrication. As piece 22 moves past its approximately ¼ open position, a great deal of weight is carried at the location where ball 72 is located, providing further lubrication at this point.

It should be apparent that the weight of the drawer is carried by the parts on their respectively vertical dimensions, which are generally larger than their respective horizontal dimensions. In addition, the structure is nearly a solid unit since there is an almost total absence of spacing between the parts. This construction provides adequate weight bearing for a large number of applications.

To disassemble the unit to replace a worn or defective part, it is only necessary to remove peg 62. This allows piece 24 to be pulled out in the forward direction. This piece is the smallest and hence the most fragile piece.

The plastic pieces can be readily massed produced by techniques well-known in the art and require little individual handling.

While a preferred embodiment of the invention has been discussed, it will be understood that the invention is not limited thereto since many modifications may be made and will become apparent to those skilled in the art.

What is claimed is:

1. A nested plastic extension slide for mounting a drawer into an accommodating opening in an apparatus, comprising an outer piece having a "C" shaped vertical cross section, the vertical base thereof being suited for installation on an inside wall of a drawer opening of the apparatus, the open side of the "C" ending in an upturned lower branch and in a downturned upper branch, a center piece having a "C" shaped vertical cross section facing in the same direction as the "C" shaped cross section of said outer piece, the open side of the "C" having a downturned upper branch and an upturned lower branch, said vertical base of the "C" of said center piece having an upward vertical flange extending behind said downturned upper branch of the "C" shaped cross section of said outer piece and a downward vertical flange extending behind said upturned lower branch of the "C" shaped cross section of said outer piece, the lower branch of the "C" shaped cross section of said center piece being vertically supported by the top edge of the upturned lower branch of the "C" shaped cross section of said outer piece, and an inner piece having a base extending behind the downturned upper branch and upturned lower branch of the "C" shaped cross section of said center piece and having a center portion vertically supported by the top edge of the upturned lower branch of the "C" shaped cross section of said center piece, said center portion of said inner piece being suited for mounting to the outside surface of the vertical side wall of the drawer, whereby the vertical load of the drawer is supported by the respective upturned lower branches of the "C" shaped outer piece and center piece.

2. A nested plastic extension slide in accordance with claim 1, wherein the forward top edge of said upturned lower branch of the "C" shaped cross section of said outer piece includes a plurality of depressions, and including individual ball bearings in each of said depressions to provide a bearing surface between said outer piece and said center piece.

3. A nested plastic extension slide in accordance with claim 2, wherein the rearward top side of said upper branch of said center piece includes at least one depression, and including a ball bearing in said upper branch center piece depression to provide a bearing surface between the bottom edge of said downturned upper branch of said outer piece and said upper branch of said center piece.

4. A nested plastic extension slide in accordance with claim 3, wherein the rearward bottom side of said lower branch of said center piece includes at least one depression, and including a ball bearing in said lower branch center piece depresssion to provide a bearing surface between the top edge of said upturned lower branch of said outer piece and said lower branch of said center piece.

5. A nested plastic extension slide in accordance with claim 1, wherein said center piece includes an inwardly projecting stop at the approximate mid-point of its base, and said base of said inner piece includes an elongated slot riding over said center piece stop, the rearward slot end encountering said stop when said inner piece is moved forward to move said center piece forward.

6. A nested plastic extension slide in accordance with claim 5, wherein said rearward slot end is a removable peg through said base of said inner piece.

7. A nested plastic extension in accordance with claim 5, wherein said slot is open to the rear end of the base of said inner piece before being closed off by said peg.

8. A nested plastic extension slide in accordance with claim 5, wherein the forward slot end encounters said stop when said inner piece is moved backward in closing the extension to move said center piece backward.

9. A nested plastic extension in accordance with claim 5, wherein said center portion of said inner piece includes a center strip covering said slot to the inside, said center strip being suitable for mounting to the drawer.

10. A nested plastic extension in accordance with claim 5, and including a stop strip inside the forward portion of one of the branches of the "C" shaped cross section of said outer piece, and including a rearward mating stop on said center piece that encounters said stop strip to limit the forward movement of said center strip.

11. A nested plastic extension in accordance with claim 1, and including a plate closing the back of the "C" shaped cross section of said outer piece for limiting the rearward movements of said center piece and said inner piece.

* * * * *

UNITED STATES PATENT AND TRADEMARK OFFICE
CERTIFICATE OF CORRECTION

PATENT NO. : 4,712,927

DATED : December 15, 1987

INVENTOR(S) : Robert Arrendiell et al

It is certified that error appears in the above-identified patent and that said Letters Patent is hereby corrected as shown below:

On the title page, Item (54), the middle initial of "Gwendolyn Ellis" should be a "G".

Signed and Sealed this

Seventh Day of June, 1988

Attest:

*Attesting Officer*

DONALD J. QUIGG

*Commissioner of Patents and Trademarks*